United States Patent [19]

Vierstraëte

[11] 4,294,150
[45] Oct. 13, 1981

[54] SAWING OR CUTTING MACHINE

[76] Inventor: Jean Vierstraëte, 83, rue Victor Hugo à, Oignies (Pas-de-Calais), France

[21] Appl. No.: 52,494

[22] Filed: Jun. 27, 1979

[30] Foreign Application Priority Data

Jun. 27, 1978 [FR] France .................. 78 19834

[51] Int. Cl.³ .................. B23D 47/04; B23D 47/08
[52] U.S. Cl. .................. 83/453; 83/454; 83/461; 83/466.1; 83/488; 83/477.2; 83/594
[58] Field of Search .............. 83/488, 466.1, 676, 83/473, 477.2, 486.1, 471.2, 471.3, 453, 454, 594, 461

[56] References Cited

U.S. PATENT DOCUMENTS

| | | | |
|---|---|---|---|
| 3,313,193 | 4/1967 | Orendi | 83/488 |
| 3,768,358 | 10/1973 | Zbinden | 83/488 X |
| 3,812,752 | 5/1974 | Jaegers | 83/676 |
| 3,946,631 | 3/1976 | Malm | 83/488 X |
| 4,164,883 | 8/1979 | Jägers | 83/488 |

FOREIGN PATENT DOCUMENTS 1091467 4/1955 France .
1593535 7/1970 France .
1156468 6/1969 United Kingdom .

*Primary Examiner*—Donald R. Schran
*Attorney, Agent, or Firm*—Robert E. Burns; Emmanuel J. Lobato; Bruce L. Adams

[57] ABSTRACT

A sawing machine for the straight or oblique cutting or sawing of profiled sections has two columns maintained parallel by two bridging members and along which slide followers adjustable by nut and screw, and a tool holder which can pass between the followers into the profiled section, and there being one or more jacks for vertically clamping the workpiece. An automatic centering and clamping mechanism clamps the workpiece laterally.

8 Claims, 5 Drawing Figures

SAWING OR CUTTING MACHINE

FIELD OF INVENTION

This invention relates to a sawing or cutting machine with vertical upward displacement of the cutting element as is known, and which can employ any kind of cutting tool, abrasive and the like.

BACKGROUND OF INVENTION

With such a machine the capacity is reduced by the presence of the tool support body connected to that of the cutting table and which can be fixed or rotatable for oblique cutting which limits vertical movement. Moreover this arrangement prevents the tool support body from penetrating into the interior of a profiled section, such as an H, and considerably reduces the capacity of the machine and its tool. This is exemplified in French Pat. No. 1091467 (Moulin) and British Pat. No. 1,156,468 (Buckley).

Moreover such a machine incorporated in a bench equipped with a roller conveyor requires its cutting table to be accurately aligned with the rollers. In order to displace the profiled section it is necessary to have the rollers hydraulically or otherwise raised to permit its displacement above or over the table.

SUMMARY OF THE INVENTION

The present invention has for its object the remedy of these inconveniences and the solving of the problems encountered.

The invention is characterized by causing the sliding tool support to slide on at least two columns or slideways by friction, ball or roller runners, or other means and by at least one slide actuated by at least one jack and supporting at least one support or follower below a workpiece and which can be either cut-away to conform with the upper form of the tool support and in this case one or more intermediate bars can fill the free space to permit sawing of bars of narrow section; or at least one slide actuated by at least one jack and provided with at least one support follower with controllable spacing to achieve the same purpose, this spacing can be effected manually or be motorized and synchronized; and, in the third place, and at its upper part the machine has a connecting element forming a lintel supporting a clamping and automatic centralizing mechanism (French Pat. No. 1593535 Vierstraete) modified and adapted for this purpose, and at least one vertical jack clamping the workpiece on the lower support or follower. The operations may be mechanical, hydraulic, pneumatic, hydro-pneumatic or otherwise and it is equally possible to provide several vertical clamping jacks at each side of the cutting tool to support the web of the profiled section and to contain the force of the tool.

Opposite the lintel is disposed the base of the machine receiving the tool mounting arrangement and its controls, the lintel and base maintaining the columns or slideways parallel.

The following advantages are obtained:

Greater rigidity, the sliding tool carrier is displaceable upwardly from the base.

The avoidance of having elevatable roller arrangements.

The automatic centering and lateral clamping of the workpiece before its vertical clamping.

The absence of dismantling and re-assembling of machine components to allow for different kinds of workpieces and for straight and oblique cutting.

Lower cost due to the use of sliding elements.

The possibility of making machines of very large capacity while retaining the rigidity.

Higher sawing capacity. cl BRIEF DESCRIPTION OF DRAWINGS

The present invention will now be described by way of example with reference to the accommpanying drawings in which.

DESCRIPTION OF PREFERRED EMBODIMENT

Figure 1:
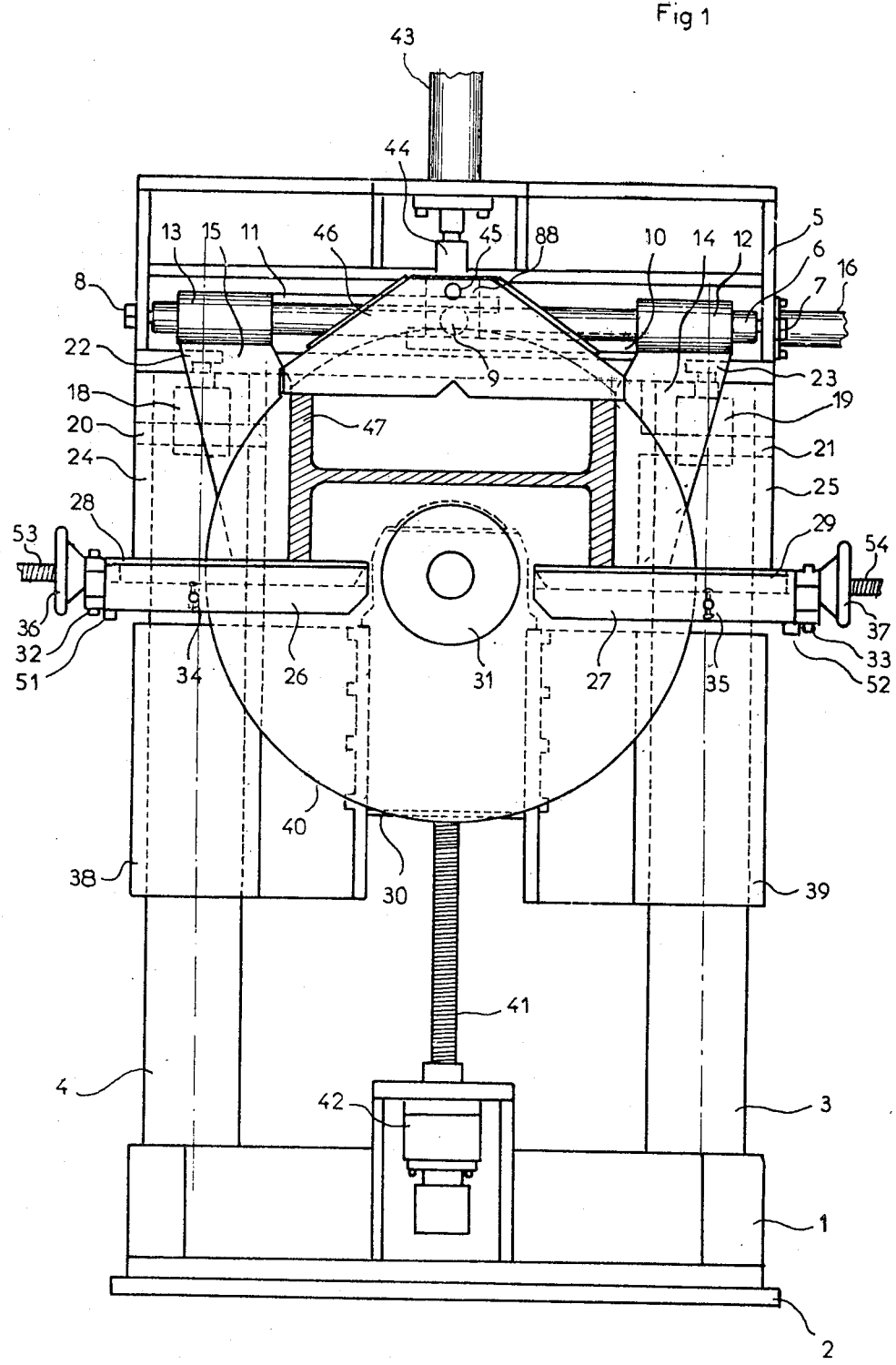
FIG. 1 is a front view of a sawing machine according to the present invention showing the cutting of an H-section.
Figure 2:
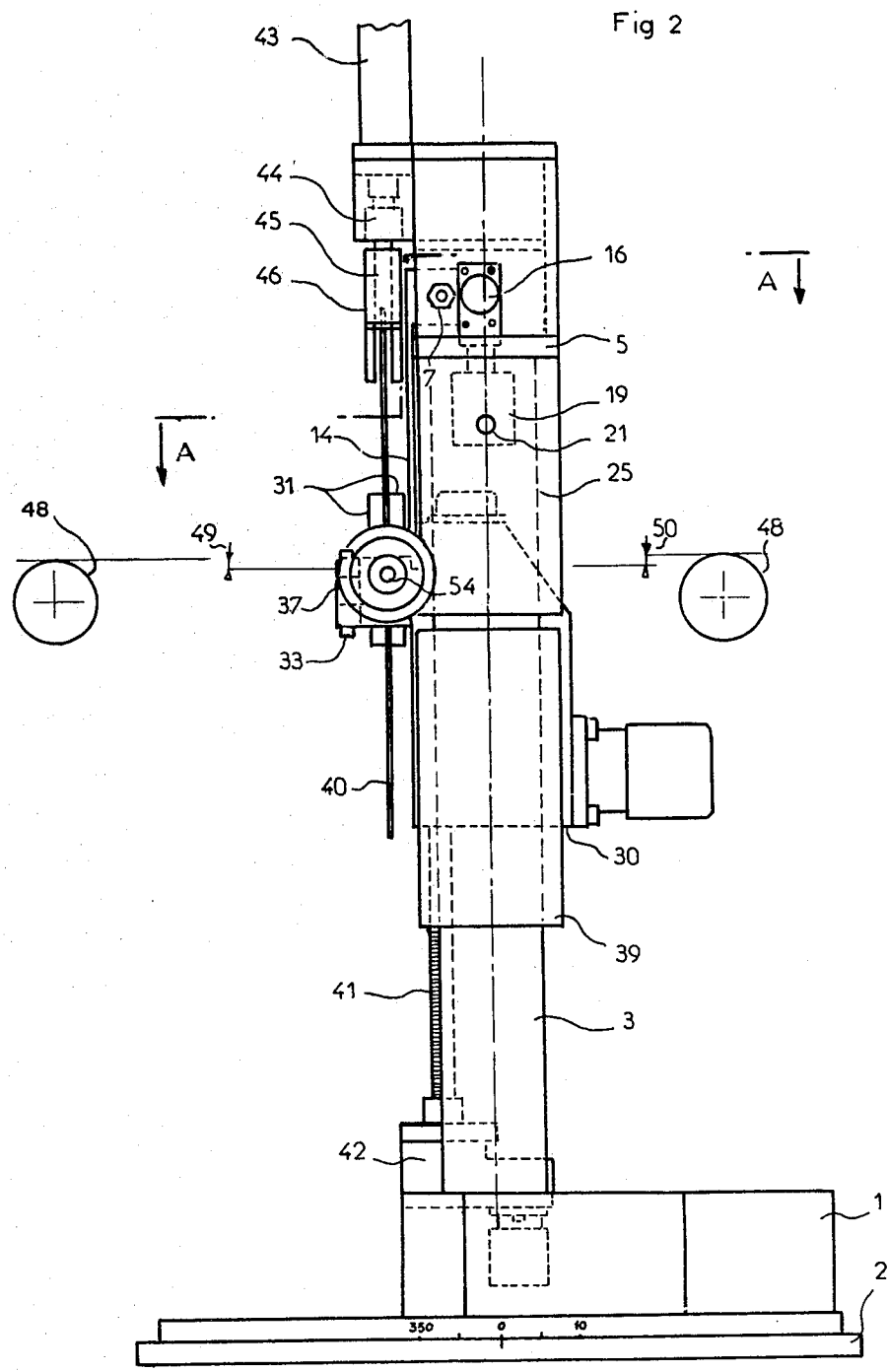
FIG. 2 is a side view of the same machine in the same condition but shown without the H-section.
Figure 3:
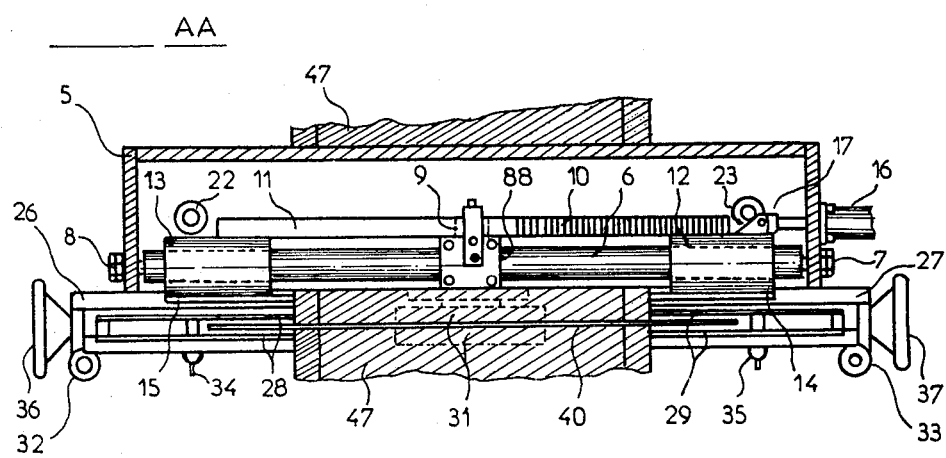
FIG. 3 is a plan view showing a cross-section along the line A—A in FIG. 2.
Figure 4:
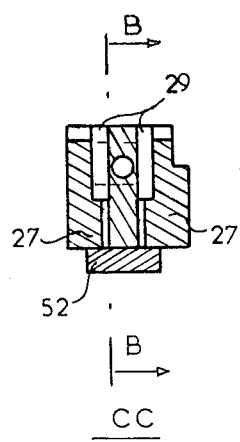
FIG. 4 is a cross-sectional view of the line C—C of FIG. 5 which shows a cross-bar and its follower.
Figure 5:
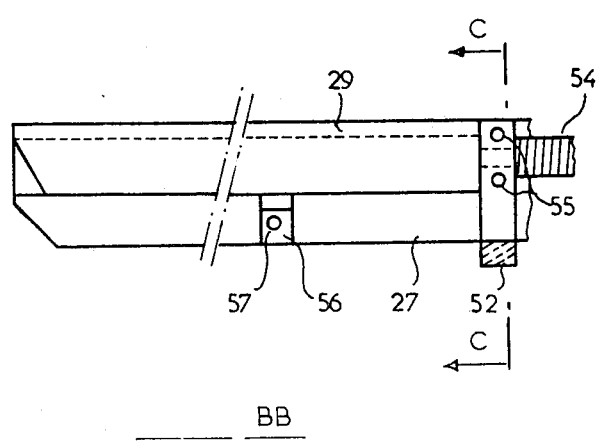
FIG. 5 is a cross-section on the line B—B of FIG. 4 showing the said cross-bar.

The drawings show a machine with a base 1 which can be situated on a turntable 2 when it is desired to cut obliquely and which supports two columns 3, 4. These columns 3, 4 are parallel and retained in alignment by a lintel 5 and are held in position by being screwed into bores or by hot or cold force fitting, the latter being accomplished by liquid nitrogen for example.

The lintel 5 carries a clamping and automatic centralizing mechanism which has been developed for this machine. The mechanism comprises a shaft 6 maintained horizontal by gudgeons and lock-nuts 7, 8 and by a central member 88 which supports a pinion 9 which meshes with two racks 10, 11. The racks 10, 11 control and synchronise the synchronous movement of slides 12, 13 to which they are attached respectively and which are respectively integral with two arms 14, 15 forming the clamp of the aforesaid mechanism.

A hydraulic jack 16 is attached to the lintel 5 and its rod is attached to the slide 12 by lugs 17 along an axis traversing the latter. The jack 16 acts on the slide 12 and the rack 10 which turns the pinion 9 so entraining the rack 11 and the slide 13 thus ensuring the centering and clamping of the workpiece. Along the upper portion of each column 3, 4 slides a shaft 24, 25, controlled by a hydraulic jack 18, 19. The connection of the jacks 18, 19 to the shafts 24, 25 being effected by the aid of cylindrical pins 20, 21 which lie in aligned bores formed in the rear housing of the jack and in the shafts 24, 25. The shafts 24, 25 are hollow to accommodate the jacks 18, 19. The connection of the shafts 24, 25 with the lintel 5 is made with the aid of lock-nuts 22, 23 screwed to the rods of the jacks 18, 19, the shoulders of which nuts 22, 23 bear on the two faces of the lintel perpendicular to the rods opposite to the screws.

The shafts 24, 25 each carry, at their base, a cross-bar 26, 27 which is limited in length to the interior of the machine in order to accommodate, between the bars 26, 27 the reduction motor 30 of a saw having hub plates 31 and blade 40. The cross-bars are each formed of two members which define a slit in order to permit the blade of the saw to pass between them. The outer members of the cross-bars 26, 27 are pivoted on hinges 32, 33 and are normally secured by wing-screws 34, 35, release of the latter and outward hinging of the members permitting the mounting and dismounting of the blade 40.

The cross-bars 26, 27 each have a support or follower 28, 29 which, in response to requirements, can be slide forwards and which are centered and fixed in position in front of the blade by pins which can be fitted into the bores 55 and which thus secure the assembly.

In order to withstand the force exerted on this assembly by the profiled section clamped by the jack 43 a heel 51, 52 rests and slides on the underside of cross-bars 26, 27.

The positioning and spacing between the members 26, 27 is regulated by hand-wheels 36, 37 forming nuts integral with the cross-bars and acting on the screws 53, 54 fixed to the members 26, 27. This permits the spacing between the members to be reduced as a function of the descreasing size of the workpiece to be cut.

The ton of the members 26, 27 in their highest position, coincides with the level of the top of exterior rollers 48 which corresponds to the coupling of the shafts 24, 25 with the lintel 5 when the jacks 18, 19 are in a fully withdrawn state, whereas the cutting position of the members 26, 27 (their lowest position) corresponds to the extension of the jacks, the spacing 49, 50, corresponding to the length of jack stroke, permits free movement of workpieces above the members.

The reduction motor 30 rotates the saw 40 through the intermediary of hub plates 31 and is connected to shafts 38, 39 to form a slide, whereof the movements are controlled by a screw 41 actuated by a reduction motor 42 resting on the base 1, the slide sliding on columns 3 and 4.

On the lintel 5 is fixed a hydraulic jack 43 on which is mounted a support 44 and a spindle 45 supporting a vertical clamping cross-bar 46 movable along a path sufficient to clamp profiled sections of minimum and maximum dimensions. It is to be noted that this cross-bar can be adapted to specific cases and the jacks can be of a number sufficient to clamp the section 47 on its web thus neutralising the force of the tool and preventing buckling.

I claim:

1. A sawing machine capable of straight or bias cutting comprising a frame having a pair of vertically extending members spaced from one another, a motor having a horizontal shaft and a rotary saw having a saw blade mounted on said shaft, means for mounting said motor on said frame and for moving it vertically of said frame, means for supporting a workpiece comprising two generally horizontal cross-bars extending toward one another from said vertical members of said frame, inner ends of said cross-bars being spaced from one another to leave room for said motor and saw, each of said cross-bars comprising two parallel members which are spaced apart to receive said saw blade between them, means for centering said workpiece on said supporting means and means engaging said workpiece from above for holding it down on said supporting means, said motor and saw being movable upwardly to cut a workpiece supported by said supporting means, centered by said centering means and held down by said hold-down means.

2. A sawing machine according to claim 1, in which one of said members of each of said cross-bars is hinged to moving outwardly for removal of installation of a saw blade of said saw.

3. A sawing machine according to claim 1, in which said cross-bars are movable toward and away from one another to vary the space between inner ends of said cross-bars.

4. A sawing machine according to claim 1, in which a support extending lengthwise on each of said cross-bars is slidable lengthwise of said cross-bar, and in which means is provided for securing said support in selected position relative to said cross-bar.

5. A sawing machine according to claim 1, in which said machine is associated with conveying means for said workpiece, and in which said cross-arms are movable vertically of said frame to adjust them vertically with respect to said conveying means.

6. A sawing machine according to claim 1 in which said centering means comprises clamping members movable toward one another to engage opposite sides of the workpiece, means for moving said clamping members, and means operably interconnecting said clamping members to coordinate their movement toward one another.

7. A sawing machine according to claim 1, in which upper ends of said vertical members are connected by a cross-member, and in which said hold-down means is supported by, and movable vertically relative to, said cross-member.

8. A sawing machine according to claim 1, in which said frame includes a base rotatable about a vertical axis, said vertical members extending up from said base.

* * * * *